United States Patent [19]
Seki

[11] 4,440,793
[45] Apr. 3, 1984

[54] METHOD FOR PRODUCING BREAD CRUMBS

[75] Inventor: Masao Seki, Kamakura, Japan

[73] Assignee: Fuji Foods Industry Co., Ltd., Japan

[21] Appl. No.: 374,068

[22] Filed: May 3, 1982

[30] Foreign Application Priority Data

May 8, 1981 [JP] Japan ................... 56-69235

[51] Int. Cl.³ ............................................. A21D 13/06
[52] U.S. Cl. .................................... 426/549; 426/474
[58] Field of Search ............... 426/549, 656, 447–449, 426/457, 464, 473, 512, 518

[56] References Cited

U.S. PATENT DOCUMENTS

| | | | |
|---|---|---|---|
| 2,627,465 | 3/1953 | Pettibone | 426/549 |
| 4,218,480 | 8/1980 | Dyson et al. | 426/19 |
| 4,276,317 | 6/1981 | Hayashi | 426/517 |

FOREIGN PATENT DOCUMENTS 50-16415  12/1975  Japan .................. 426/549

*Primary Examiner*—Raymond N. Jones
*Assistant Examiner*—Elizabeth A. Hatcher
*Attorney, Agent, or Firm*—Ostrolenk, Faber, Gerb & Soffen

[57] ABSTRACT

A method for producing bread crumbs comprising: forming a mixture obtained by adding 0.5–6.0% soy bean protein to wheat flour and mixing therein salt, fats, emulsifier, pH adjustor, coloring matter and flavoring material as secondary material, adding α-converted starch to the mixture, adding water thereto without adding yeast, thereafter heating and pressing the mixture by an extruder to extrude the mixture from a die into a rope-like configuration, simultaneously therewith drawing the rope-like material at a speed greater than the extrusion speed to produce bubbles and rope-like material, flattening a section of the bubbles and rope-like material, cutting and crushing the material, and drying the same.

3 Claims, 1 Drawing Figure

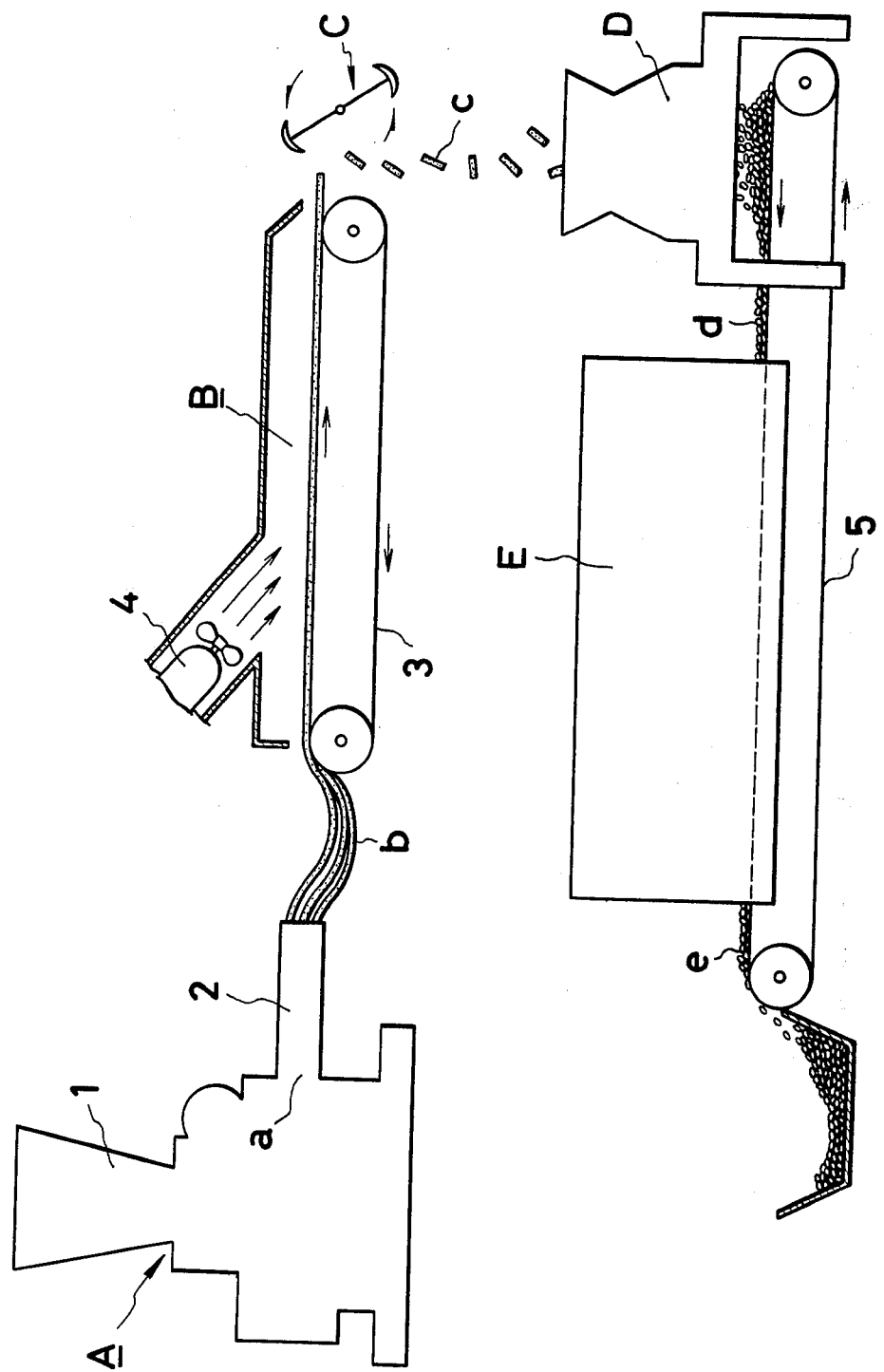

METHOD FOR PRODUCING BREAD CRUMBS

BACKGROUND OF THE INVENTION

Conventional bread crumbs are those formed into dough crumbs, which have been obtained after fermenting and baking a textured mix of the bread crumbs or which have been obtained after cooling to a room temperature bread heated by an electric heater, or those obtained by drying said dough crumbs. There is a recent tendency in shaping bread crumbs that the shape prepared into a flake-like form is accepted. Accordingly, the manufacturing step becomes extended requiring at least two days, extensive space and many labors, and the consumption of thermal energy is extremely great.

On the other hand, in the present invention, bread crumbs may be produced in an extremely short period of time, in a small space and in an extremely economical manner by employment of automated volume production system with less operators while saving energy.

SUMMARY OF THE INVENTION

The method comprises forming a mixture obtained by adding 0.5–6.0% soy bean protein to wheat flour and suitably mixing therein salt, fats, emulsifier, pH adjustor, coloring matter, and flavoring material as secondary material, further adding approx. 5–20 weight % α-converted starch to wheat flour, adding an extremely small amount of water, approx. 30%, to said mixture, heating and pressing said mixture at a temperature from 60° to 200° C., preferably, from 110° to 150° C. from an extruder, into a rope-like fashion from a die, simultaneously stretching the same on a conveyor at a speed greater than the extrusion speed, that is, in the range from 1.2 to 3.0 folds to thereby effect foaming and simultaneously flattening a section of rope-like configuration, cutting the same while cooling it or not cooling it, crushing and then drying it, and finally feeding the same to an automated packing machine. According to this method, parts to be pulverized are in an extremely small amount and flake-like bread crumbs may be produced with high yield. It took 36 hours to produce crumbs in conventional methods whereas 8 hours are used in the present method. In addition, in the present invention, it it possible to employ a volume production system in which the entire steps to the final packing step are automated with a minor space and a small number of operators.

BRIEF DESCRIPTION OF THE DRAWINGS

The single drawing is an illustration showing the steps for a method of producing bread crumbs in accordance with the present invention.

DETAILED DESCRIPTION OF THE INVENTION

The present invention relates to a method for producing bread crumbs or bread crumbs-like food (hereinafter generally referred to as "bread crumbs") which has a textured shape and a taste analogous to bread crumbs and has uses similar to bread crumbs, and particularly to a method for producing flake-like bread crumbs.

Conventional bread crumbs are those formed into dough crumbs, which have been obtained after fermenting and baking a mixture of the bread crumbs or which have been obtained after cooling to a room temperature bread heated by an electric heater and then crushing the same, or those obtained by drying said dough crumbs.

There is a tendency in shape of bread crumbs that the shape prepared into a flake-like form is accepted.

The present invention has been achieved under these circumstances and provides an entirely new method which employs a volume production system capable of producing crumbs economically in an automated mode.

According to the above-described conventional method, the producing step becomes extended requiring at least two days, extensive space and many labors, and the consumption of thermal energy is extremely great.

The object of the present invention is to efficiently produce bread crumbs in a short period of time, in a small space and in an energy saving manner with less operators.

In the method of the present invention, a mixture for bread crumbs is drawn from an extruder through various shapes of dies at a speed greater than the extrusion speed thereof. For example, the mixture may be extruded into a plate-like form to form a cracker-like form or it may be extruded from a circular die into a rope-like form. However, it has been found that the best result may be obtained by extrusion of the mixture into a rope-like form. In this manner, the mixture is mixed, heated and pressed, and then extruded from the extruder, whereupon it is pulled, that is, stretched at a speed greater than the extrusion speed, after which the the rope-like product produced is cut, crushed and dried, or not dried as necessary, without cooling for a long period of time as in prior art methods. This stretching of the rope-like product is preferably effected at a speed of 1.2 to 3.0 folds of the extrusion speed. For example, if the extrusion speed is actually 10 cm/sec, the stretching may be effected at a speed of 12 to 30 cm/sec. This stretching is carried out by adjusting the conveyor speed.

The mixture of raw material for producing bread crumbs comprises a wheat flour as a main component, to which is added vegetable protein, particularly soy bean protein, and added, as needed, salt, fats, emulsifier, pH adjustor, coloring matter, flavoring material, etc. as secondary material, further added, as needed, a suitable amount of α-converted starch, after which water is suitably added thereto without adding yeast at all and the material is heated and pressed, and then extruded in the form of a rope from the extruder. Instantaneously with extrusion of material from the die of the extruder, contained water is vaporized at that time and as a result, the surface as well as the interior of the material foam. At this time, internal bubbles are in the shape close to a sphere, which shape is however flattened by stretching and oriented in a pulling direction. The temperature within the extruder is adjusted to 60°–200° C., preferably, 110°–150° C. Accordingly, the starch is α-converted.

However, when the temperature exceeds 200° C., the starch is excessively α-converted, giving out an offensive smell and being pulverized, which is not favorable, whereas if the temperature is below 60° C., it takes much time for blending and a portion not subjected to α-conversion is mixed.

Thus, it is preferable that α-converted starch is premixed into the mixture, the amount of which is 5–20 weight % of wheat flour, preferably, approx. 10 weight %. By adding α-converted starch beforehand into the mixture as described above, very brittle properties of material heretofore involved may be improved to form elastic and viscous good bread crumbs. Also, in the crushing process and in packing, the rate of pulverization is low, and in use, burning of fine flour can be prevented during frying in oil to provide a sweet-smelling finish.

By further adding approx. 0.5 weight % surface active agent (suitable agent is for example MyVAPLEX 600 of Eastman Kodak Co.) of wheat flour, extrusion from the extruder may be carried out smoothly.

Preferable soy bean protein used for the present invention includes alcohol-washed concentrated soy-bean protein obtained by washing nonfat soy-bean with alcohol for example alcohol containing 50-70% water, acid-washed concentrated soy-bean protein obtained by washing nonfat soy-bean with water in an acidic region in the vicinity of an isoelectric point, extracted soy-bean protein obtained by decomposing nonfat protein into water and dissolving the same therein after which bean-curd refuse is removed, and partial-hydrolyzed soy-bean protein obtained by partially hydrolyzing these soy-bean protein with for example protease.

The alcohol-washed concentrated soy-bean protein has been found to be effective in that when wheat flour and other additives are mixed after which they are extruded into a rope-like form from the extruder, those extruded are prevented from being adhered to each other and from being adhered to the machine. The soy-bean protein other than the alcohol-washed concentrated soy-bean protein are effective in that when they are extruded from the extruder, fine bubbles are included in the rope-like extruded material by the foaming power, the emulsifying power and the tackiness of water soluble protein contained therein to make a film of the bubbles thin and increase the strength thereof. Also, the fine bubbles formed by thin films strengthened by 1.2-3.0 fold stretching are elongated in a stretching direction and the bubbles form in line in an orderly way and therefore, flake-like granules peculiar to bread crumbs are obtained when crushing takes place.

Soy-bean protein has a property of not being softened even if it absorbs water, and bread crumbs in accordance with the method of the present invention are used as a coating to coat on croquettes, pork cutlets or the like, and fried in oil immediately after which there is a crispy taste, and even after they are left as they are for three to six hours, the aforesaid property remains unchanged. This offers the characteristic that the taste hot from the cooking can be maintained for a long period of time. On the other hand, conventional bread crumbs after they are fried absorb batter or water of "ingredients" and are softened, and thus pose a disadvantage that the taste hot from the frying cannot be maintained for a long period of time.

When material without addition of soy-bean protein to wheat flour is extruded from the extruder, the rope-like extruded materials are adhered to each other and are likely to be adhered also to the machine and as a result, the crushing operation is adversely affected. If soy-bean protein is not added as in conventional textured material cells of bubbles are thick and brittle, and pulverized or coarsely large flour is produced during the crushing operation, resulting in a low yield in sifting. Thus, addition of soy-bean protein into raw material comprises an enssential requisite.

In use of soy-bean protein, alcohol-washed concentrated protein and soy-bean protein other than said protein are desirably combined, an amount to be added to wheat flour is in the range from 0.5 to 6.0%, preferably, from 1 to 5%. If the amount added is less than 0.5%, it is not possible to obtain a texture having fine bubbles as in conventional bread crumbs whereas if it exceeds the upper limit, the texture becomes excessively strong, and the taste becomes excessively hard, in addition to which a smell peculiar to soy-bean is conspicuous and during frying, a flour smell occurs, and as a result, it cannot be used as bread crumbs.

Any of wheat flour such as strong power, semi-strong power, medium power and low power flour can be used individually or in the form of mixture. In the present invention, since the step of producing bread is not required, there is no limitation to only the strong power and semi-strong power wheat flour required when bread is produced.

In this manner, a bread-crumbs crusher is used to crush them into 5-20 meshes. If stretching is less than 1.2 folds, material is not formed into bread crumbs, the texture is weak and fine flour resulting from crushing increases. Further, if stretching is more than three folds, the material becomes excessively fine, granules are also excessively elongated, and the texture is also too strong, thus losing the taste of bread crumbs. There is a further disadvantage that at the stretching, the rope-like extruded material is liable to be cut.

An area of a plant which can produce bread crumbs at the rate of 500 Kg/h, and 3 tons/day in eight hours in accordance with the method of the present invention will suffice to be 200 m² except warehouses for raw materials and products and indirect producing spaces such as packing step, direct operators are 2-3 persons, thermal energies which are limited to be used for the extruder equipment are 400,000 Kcal if steam of 4 Kg/cm is used, and time required from preparation of raw material to obtaining of products is sufficient if it is eight hours. On the other hand, in the conventional production of bread crumbs from bread, in case of production at the rate of 3 tons/day, an area of a plant is approx. 500 m², operators are 6-7 persons, thermal energies are approx. 2,600,000 Kcal, and time required from preparation of raw material to products is 36 hours in two days.

In prior art systems, the step of baking bread is extended, equipment for a continuous proofer and an oven is large, thermal energy loss is large, and a space is required to cool baked bread for about 12 to 24 hours in order to crush baked bread. In addition, in production of bread, an amount of water required to be added is approx. 60% whereas in the present invention, the addition of water is approx. 30%.

The method in accordance with the present invention will now be described in connection with a flowsheet shown in the drawing. Reference character A designates an extruder, numeral 1 designates a hopper and 2 is a screw section, the extrusion temperature being possibly automatically adjusted by a heater device. A mixture is charged through the hopper 1, and the mixture is normally as given in the following table. (% is weight.)

| | |
|---|---|
| Wheat flour | 75.0% |
| Soy-bean protein | 5.0% |
| α-converted starch | 7.5% |
| Cane sugar | 3.4% |
| glycerol | 5.0% |
| Salt | 2.0% |
| Material modifier | 0.5% |

(Surface active agent)

About 30% water is added to said mixture, which is then charged through the hopper 1. The temperature in the vicinity of the die at the extreme end of the screw section 2 is preferably adjusted at a level in the range from 110° to 150°. At the moment the mixture a is pressed, heated and extruded in the form of a rope from the die, water contained therein is vaporized and foamed. As the extruded mixture b is stretched, bubbles are also flattened and oriented in a pulling direction, a section thereof is also flattened, and the degree of orientation is adjusted by making the speed of the conveyor 3 greater than the extrusion speed. Then, the rope-like material enters a cooling chamber B but is not sometimes cooled. Cooling air is fed by a cooling blower 4 from the top of the conveyor 3 within the cooling chamber B to cool the rope-like material b. Particularly, a cooling device need not be provided for, for example, a rope-like material except those having a large shape. Next, the texture is cut by a cutter C into a predetermined dimension, normally, from 5 to 10 cm. The thus cut rope-like material is then fed to a crusher D for the purpose of crushing. When the rope-like material b discharged from the extruder is fed in and crushed by the crusher D without applying tension, the material b is not formed into a uniform flake-like configuration probably because of spherical bubbles therein and is poor in shape, and much smaller fine flour than the required shape increases to lower yield. However, when the rope-like material discharged from the die is directly tensioned to flatten bubbles to orient the material to some extent, the material is finished to a beautiful and light flake-like configuration at the stage of crushing, thus preventing the material from being formed into fine flour. Crushed flake-like bread crumbs d are fed by the conveyor 5 into a drying chamber E where they are dried to form bread crumbs having a suitable amount of water. Bread crumbs can be burned to the extent that they are somewhat colored. Reference character e designates bread crumbs finished into a flake-like form and they are immediately transferred to the packing step. Preferably, drying is carried out with air at a temperature from about 150° to about 180° C.

Embodiment 1

Alcohol-concentrated soy-bean protein 1 part, separated soy-bean protein 2 parts, salt 1.5 parts, glycine 0.5 part and (the aforesaid) surface active agent 0.5 part are uniformly mixed into low-power first class flour 100 parts, and water 30 parts are uniformly mixed into said mixture 100 parts, whereby the mixture is extruded from the extruder at the speed of 5 cm/sec at 130° C. and stretched to two folds, after which bread crumbs dried to water 9% were obtained. The result of comparison in quality between the thus obtained bread crumbs and bread crumbs obtained by the conventional method is given in Table 1.

TABLE 1

Comparison in quality between bread crumbs according to the method of the present invention and bread crumbs according to the conventional method

| Bread Crumbs by the Present Method | | Comparison[1] | Bread Crumbs by Conventional Method |
|---|---|---|---|
| Texture | 16 | = | 14 |
| Granules | 15 | = | 15 |
| Color | 17.5 | = | 12.5 |

TABLE 1-continued

Comparison in quality between bread crumbs according to the method of the present invention and bread crumbs according to the conventional method

| Bread Crumbs by the Present Method | | Comparison[1] | Bread Crumbs by Conventional Method |
|---|---|---|---|
| Flavor | 14 | = | 16 |
| Taste[2] | | | |
| Immediately after produced | 16 | = | 14 |
| After 6 hours | 21[*] | > | 9 |

Note:
[1]Comparison using the method of order with general panel and 10 persons
[2]Bread crumbs are applied to the coating of croquettes for evaluation
[*]Level of significance 1%

Embodiment 2

Alcohol-washed concentrated soy-bean protein 3 parts, acid-washed concentrated soy-bean protein 2 parts, α-converted starch 10 parts, salt 1.3 parts, shortening 2 parts, monoglycerol fatty acid ester 1 part and coloring matter (sun-yellow) 0.3 part are uniformly mixed into strong-power second class flour 100 parts and water 33 parts are uniformly mixed into said mixture 100 parts, after which the mixture is extruded from the extruder at the speed of 5 cm/sec at 110° C. in accordance with the aforementioned method and stretched to 2.8 folds. The material was then cut into the length of about 5 cm and crushed and cooled to obtain raw bread crumbs. The taste evaluated by the coating for fried prawns was little different from conventional taste immediately after the production but after six hours, the taste of food in accordance with the present invention was better than that in accordance with the conventional mathod.

Embodiment 3

Alcohol-washed concentrated soy-bean protein 2 parts, partial-hydrolyzed soy-bean protein 0.5 part, α-converted starch 10 parts, salt 0.5 part, glycine 0.5 part and shortening 1 part, monoglycerol fatty acid ester 0.5 part (weight part, which is also applied to the above-mentioned part) are uniformly mixed into medium-power first class flour 100 parts and water 28 parts are uniformly mixed into said mixture 100 parts, after which the mixture is extruded from the extruder at the speed of 5 cm/sec at 120° C. in accordance with the aforementioned method. This was stretched to 1.3 folds and cut into the length of about 5 cm, after which it was crushed. Bread crumbs were obtained which have been dried to water 11% by a fluid bed dryer. Bread crumbs thus obtained were little different in texture, granules, color and flavor from conventional bread crumbs, and the taste with the coating applied to croquettes was not different from conventional bread crumbs immediately after being fried. However, after four hours, croquettes coated with bread crumbs made in accordance with the present method were better than conventional crumbs.

Bread crumbs obtained in accordance with the present method not only have excellent properties as described above as bread crumbs but also the present method is much better than the conventional methods, in terms of reduction in plant space resulting from extreme simplification of the production steps, cut-down of production time, saving of labor cost, energy saving, etc.

The method of the present invention is not only used for bread crumbs but may be applied to flake-like confectionery and cooking, in which case, addition of coloring matter, salt, sugar, spices, a seasoning, etc. can be taken into consideration.

What is claimed is:

1. A method for producing bread crumbs which comprises forming a mixture obtained by adding 0.5–6.0% soybean protein to wheat flour, mixing therein suitable amounts of salt, fats, emulsifier, pH adjustor, coloring matter and flavoring as secondary materials, adding α-converted starch to said mixture, adding water thereto without adding yeast, thereafter charging said mixture into an extruder having a die at one end thereof, heating and pressing said mixture while in said extruder and extruding the mixture from said die into a rope-like configuration, simultaneously therewith drawing the rope-like material from said extruder at a speed greater than the extrusion speed to produce bubbles within the rope-like material, flattening a section of the bubbles and rope-like material, cutting and crushing the material, and drying the same to produce bread crumbs.

2. A method for producing bread crumbs according to claim 1, wherein the soy bean protein is selected from the group consisting of alcohol-washed concentrated soy bean protein, acid-washed concentrated soy bean protein, extracted soy bean protein, separated soy bean protein and partial-hydrolyzed soy bean protein and mixtures thereof.

3. A method for producing bread crumbs according to claim 1 or 2, wherein said starch is added to said wheat flour in an amount of 5–20% by weight by said wheat flour.

* * * * *